W. MILLER.
Corn Sheller.
No. 93,328.
Patented Aug. 3, 1869.
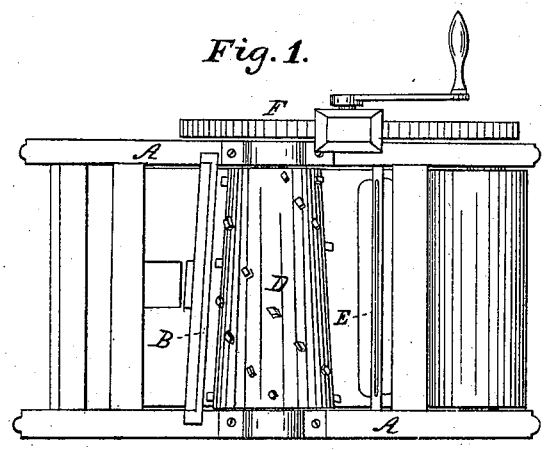
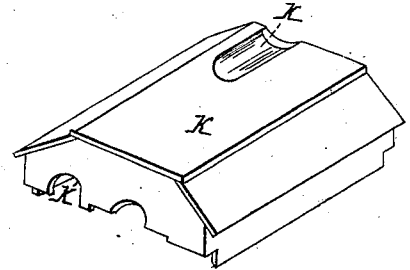
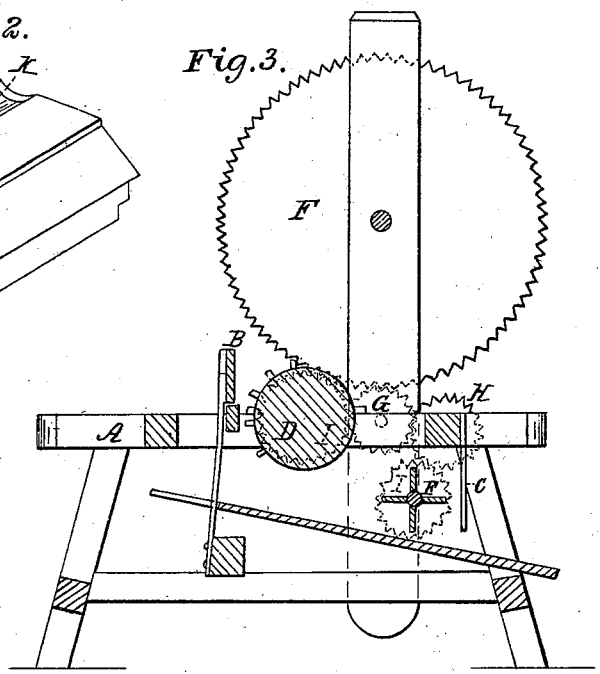
Witnesses:
L. J. Noyes
Fred Thomas
Inventor:
W. Miller
by J. W. Beadle
Attorney

United States Patent Office.

WILLIAM MILLER, OF BLOOMINGTON, INDIANA.

Letters Patent No. 93,328, dated August 3, 1869.

IMPROVEMENT IN CORN-SHELLERS.

The Schedule referred to in these Letters Patent and making part of the same.

*To all whom it may concern:*

Be it known that I, WILLIAM MILLER, of Bloomington, in the county of Monroe, and State of Indiana, have invented a new and useful Improvement in Corn-Shellers; and I do hereby declare that the following is a full and exact description of the same, reference being had to the accompanying drawings, and to the letters of reference marked thereon.

This invention relates to an improved corn-sheller, and consists in a novel construction and arrangement of the various parts.

The details of construction and manner of operation will be fully described hereinafter.

In the drawings—

Figure 1 represents a plan view of my improved machine, with the cover removed;

Figure 2 is a longitudinal section of same through line $x$-$x$, fig. 1; and

Figure 3, a view of the cover, detached from the machine.

To enable others skilled in the art to make and use my invention, I will now proceed to describe its construction and operation.

A represents the frame-work of the machine, which may be constructed in any suitable manner. It is provided with sides and a bottom, as usual, the latter of which is inclined, for the purpose of facilitating the discharge of the grain.

At one end is located the spring-board B, and at the other a board, C, which latter does not extend quite to the bottom, thus leaving a discharge-opening for the grain.

D represents a conical roller, provided with suitable teeth, which revolves nearly in contact with the spring-board B, sufficient space being left, however, to permit the ears of corn to be shelled without crushing the cob.

Below and in rear of the roller is located a fan, E, by means of which the shelled corn is perfectly cleaned.

The roller and fan are operated by means of a main driving-wheel, F, idle-wheels G H, and gear-wheels I J.

Any suitable gearing may, of course, be used.

K represents the cover of the sheller, which is provided with the orifice $k$, through which the ears are put into the sheller, and orifice $k'$, through which the cobs are discharged.

The operation of my machine is as follows:

The machine having been set in motion, the ears are put into the orifice $k$. Falling between the spring-board and the cylinder, they are quickly divested of the corn, and thrown out by the action of the teeth, through the orifice $k'$. The corn, having been thoroughly cleansed in falling, by the action of the fan, passes out at the rear of the machine.

By this specific arrangement, a specific and efficient machine is produced.

Having thus fully described my invention,

What I claim as new, and desire to secure by Letters Patent, is—

The corn-sheller described, consisting of the frame A, spring-board B, board C, cylinder D, fan E, and cover K, the whole being combined and arranged as described, for the purpose set forth.

This specification signed and witnessed, this 15th day of June, 1869.

WILLIAM MILLER.

Witnesses:
WM. M. TATE,
ALEX. LEOZADDER.